J. W. AYLSWORTH.
DUPLICATE SOUND RECORD.
APPLICATION FILED NOV. 7, 1906.
958,210.
Patented May 17, 1910.
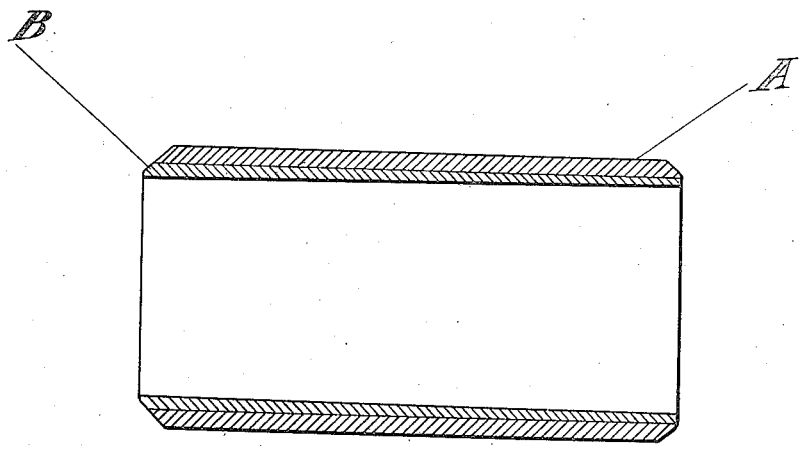

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

DUPLICATE SOUND-RECORD.

958,210.  Specification of Letters Patent.  Patented May 17, 1910.

Application filed November 7, 1906. Serial No. 342,318.

*To all whom it may concern:*

Be it known that I, JONAS W. AYLSWORTH, a citizen of the United States, residing at 223 Midland avenue, East Orange, county of Essex, and State of New Jersey, have invented certain new and useful Improvements in Duplicate Sound-Records, of which the following is a description.

My invention relates to an improved duplicate sound record, preferably cylindrical in form, and my object is to provide a record, whose major portion shall be composed of a hard composition incapable of being accurately reamed, such as a composition employing asphalt, but which shall have a perfectly true bore for its reception on the mandrel of a talking machine.

In experimenting with compositions employing asphalt, I have found that although they are very desirable on account of their qualities of cheapness, hardness and great durability, yet, it is very difficult to properly ream out the records formed of such compositions to make them accurately fit the mandrel, since the material is too viscid to be smoothly cut while hot; and, when cold, it is so brittle that if it were attempted to ream it there would be great danger of breaking the record; besides which, the reaming of the record when cold, and hence when removed from the mold, is objectionable, as the record surface is likely to become injured. I find that a composite record can be made by a process consisting in rotating a mold at a high speed and introducing suitable compositions therein which will be distributed over the bore of the mold by the centrifugal force developed, as I disclose in Letters Patent, No. 855,605, dated June 4, 1907, and that if the compositions thus introduced within the mold are of different specific gravities, and are of such a character that they do not mix together, it is possible to distribute them in clearly defined layers, which become intimately welded together. Taking advantage of this fact, I have produced a composite record in which the outer portion thereof, preferably considerably more than half, and which portion carries the record surface, is formed of a very hard tough composition, such as a composition employing asphalt or an equivalent ingredient, while the inner portion of the record is formed of a material which can be readily removed or turned to shape, such for example, as the ordinary record compositions now used, consisting of stearate of soda, free stearic acid, stearate of alumina, and ceresin, with or without carnauba or equivalent wax. If desired this latter material may contain relatively large proportions of the hydrocarbon ingredient, such as ceresin or paraffin, the only effect of which would be to soften the composition without affecting its reaming qualities. Likewise, it may be mixed with inert substances like clay or finely ground wood fiber, without seriously interfering with its reamability. The asphalt composition which I prefer to employ is made the subject of Letters Patent No. 920,245, granted May 4, 1909, and consists of a mixture of a hard asphalt (such as gilsonite) stearate of lead, and a resin gum (such as copal, kauri, or colophony). This composition can be very perfectly molded by the process indicated in my application for Letters Patent above referred to. After the introduction of the asphalt composition in the mold, the reamable composition is introduced in smaller proportion, and the two compositions will be distributed, the heavier asphalt composition being forced outward so as to take an impression from the mold, and the lighter reamable composition distributing itself over the interior of the asphalt composition. The two layers are very clearly defined, although they are intimately welded together. After the record has been formed, and while hot and still within the mold, it is reamed out in the usual way, this being possible since compositions containing stearate of soda cut very smoothly while hot.

In order that the invention may be better understood, attention is directed to the accompanying drawing, forming part of this specification, and in which I illustrate a sectional view of my improved record.

A represents the outer layer carrying the record surface and formed of a hard, tough composition such as one employing asphalt or similar ingredient, and B the layer of reamable material such as a composition employing stearate of soda.

Having now described my invention, what I claim as new and desire to secure by Letters Patent is as follows:

1. A composite record, comprising an outer layer of a hard, tough, but plastic material when hot, and an interior layer of a composition reamable when hot, substantially as and for the purposes set forth.

2. A composite record, comprising an outer layer of a hard, tough, but plastic material when hot, and an interior layer of a composition reamable when hot, the two layers being intimately welded together, substantially as and for the purposes set forth.

3. A composite record, comprising an outer layer formed of an asphalt composition, and an inner layer formed of a composition reamable when hot, substantially as and for the purposes set forth.

4. A composite record, comprising an outer layer formed of an asphalt composition, and an inner layer formed of a composition reamable when hot, the two layers being intimately welded together, substantially as and for the purposes set forth.

5. A composite record, comprising an outer layer of an asphalt composition, and an inner layer employing stearate of soda, substantially as set forth.

6. A composite record, comprising an outer layer of an asphalt composition and an inner layer employing stearate of soda, the two layers being intimately welded together, substantially as set forth.

7. A composite record, comprising an outer layer formed of a composition employing asphalt and stearate of lead, and an inner layer of a non-viscid material when hot, substantially as and for the purposes set forth.

8. A composite record, comprising an outer layer formed of a composition employing asphalt and stearate of lead, and an inner layer employing stearate of soda, substantially as and for the purposes set forth.

9. A composite record, comprising an outer layer formed of an asphalt, stearate of lead, and a resin gum, and an inner layer composed of a non-viscid material when hot, substantially as and for the purposes set forth.

10. A composite record, comprising an outer layer formed of a composition employing asphalt, stearate of lead and a resin gum, and an inner layer employing stearate of soda, substantially as and for the purposes set forth.

This specification signed and witnessed this 3rd day of November 1906.

JONAS W. AYLSWORTH.

Witnesses:
FRANK L. DYER,
ANNA R. KLEHM.